Figure 5:
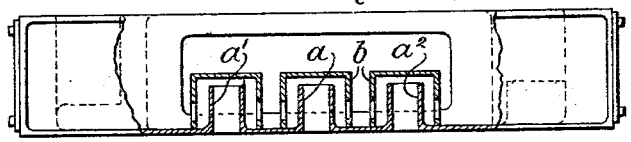

No. 745,470. PATENTED DEC. 1, 1903.
G. WILTON.
APPARATUS FOR THE DISTILLATION OF AMMONIACAL LIQUORS.
APPLICATION FILED NOV. 3, 1902.
NO MODEL. 2 SHEETS—SHEET 1.
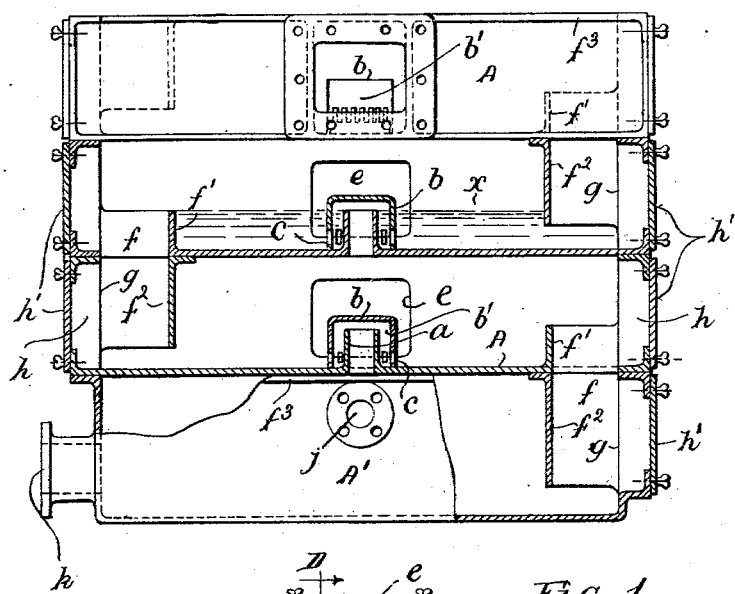
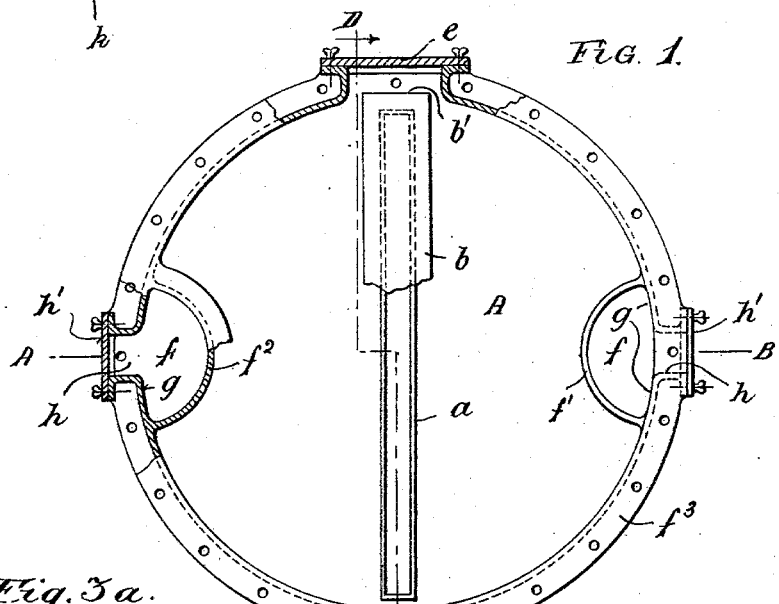
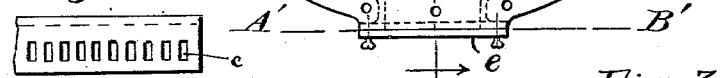
WITNESSES: INVENTOR:

No. 745,470. PATENTED DEC. 1, 1903.
G. WILTON.
APPARATUS FOR THE DISTILLATION OF AMMONIACAL LIQUORS.
APPLICATION FILED NOV. 3, 1902.
NO MODEL. 2 SHEETS—SHEET 2.

WITNESSES:
INVENTOR:
George Wilton
By his Attorneys.

No. 745,470. Patented December 1, 1903.

UNITED STATES PATENT OFFICE.

GEORGE WILTON, OF LONDON, ENGLAND.

APPARATUS FOR THE DISTILLATION OF AMMONIACAL LIQUORS.

SPECIFICATION forming part of Letters Patent No. 745,470, dated December 1, 1903.

Application filed November 3, 1902. Serial No. 129,792. (No model.)

*To all whom it may concern:*

Be it known that I, GEORGE WILTON, a subject of the King of Great Britain, and a resident of London, England, have invented certain new and useful Improvements in Apparatus for the Distillation of Ammoniacal Liquors, of which the following is a specification.

This invention relates to apparatus for the distillation of ammoniacal liquors. Apparatus for this purpose as commonly used consists of superposed circular trays or chambers constituting a tower, each of said trays or chambers being provided with a pipe extending for a suitable distance above and bebelow the bottom of the tray, the upper end of this pipe passing up to a suitable height above its tray to insure a proper liquid-level therein and the lower extremity reaching down to approximately the liquid-level of the tray next below. Each of these trays has a central opening to allow the steam by which the distillation is effected to rise up through the series of trays. Over the steam-orifice of each tray is mounted a circular hood or baffle, usually serrated at its periphery, and which dips below the level of the liquid in the tray. The ammoniacal liquor passes down by the pipes through the series of trays, and the steam rises through the trays, bubbling out under the edges of the baffles through the liquor and thence rising to the next tray or chamber. Apparatus constructed in this manner has several defects. First, it is very difficult to clean, even by the mud-holes which are provided in the sides of the trays for the purpose, because the chambers or trays are necessarily shallow and the pipes by which the liquor passes down from tray to tray extend up and down, as before mentioned, to the liquid-level in each tray. It is thus practically impossible to get at the interior of these pipes to clean them through the mud-holes. Moreover, the hoods over the steam-openings are too large to be removed through the mud-holes, and consequently they cannot be cleaned with any degree of efficiency. Further, as these baffles are circular and a considerable space exists between their outer circumference and the sides of the trays or chambers a large amount of liquor flows around the baffle to the outlet of the tray without coming under the action of the steam.

It is the object of my invention to overcome these defects and to render all working parts of the apparatus accessible for cleaning purposes and also to increase the efficiency of the apparatus.

I will describe my invention with reference to the accompanying drawings, in which—

Figure 4:
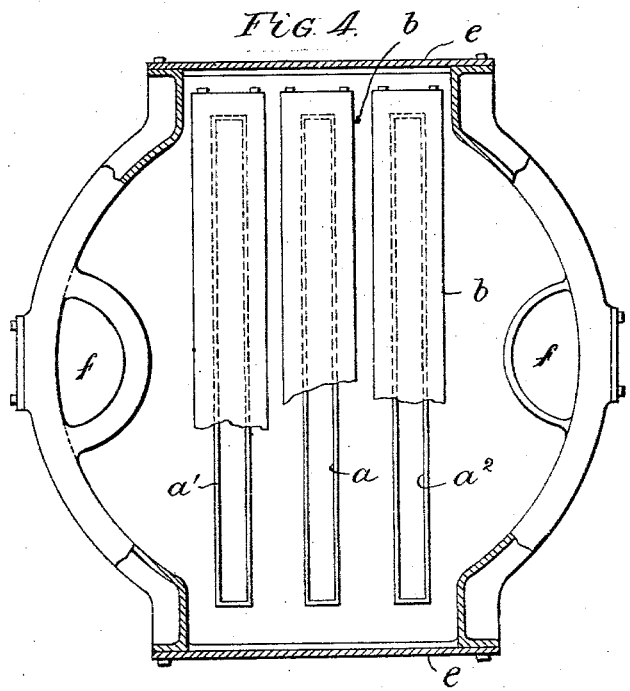
Figure 6:
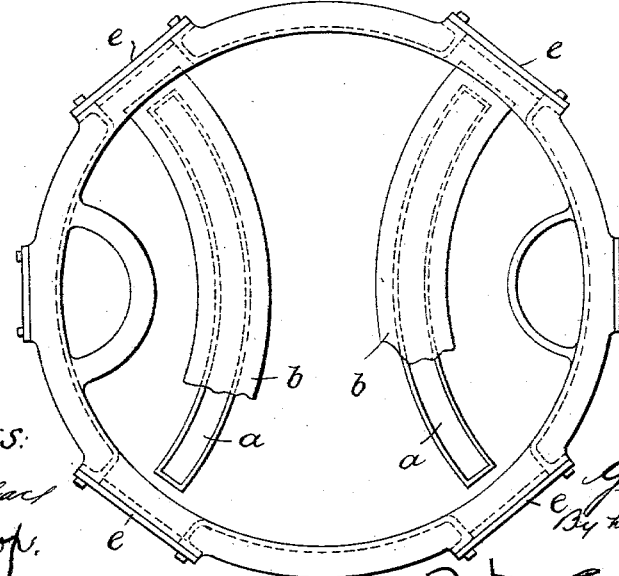

Figure 1 is a plan looking down upon a tray, which is shown partly in section. Fig. 2 is a sectional view, showing two trays in section on the line A B in Fig. 1 and showing a base and a third tray in section, partly on line A' B' of Fig. 1. Fig. 3 is a sectional view taken approximately on the line C D in Fig. 1, showing at right hand a baffle-hood and steam-opening in longitudinal section and at left hand showing the baffle-hood in elevation. Fig. 3$^a$ is a detail view of a modified form of baffle-hood. Figs. 4 and 5 are respectively a sectional plan and a sectional elevation of a tray showing a modified form of the invention; and Fig. 6 is a plan view showing another modification, the baffles being shown partly broken away.

According to one part of my invention I make the steam-openings $a$ of the trays or chambers A and the baffles or hoods $b$ thereof, which depend into the liquor in the trays, of somewhat narrow elongated form, and I extend them across substantially the full width of the trays. The baffles $b$ may be formed along their lower edges with a series of holes $c$, as shown in Fig. 3$^a$, or may be serrated, with perforated supporting-legs at intervals, as shown in Fig. 3, or otherwise formed in the usual or other convenient way to facilitate the passage of the steam out from below the baffles and up through the liquor, the level of which when quiescent is indicated at $x$, Fig. 2. I dispose the passages $f$, which form the inlet-opening for one tray and the outlet-opening for the tray below, at alternately opposite sides of the baffle $b$, as shown. The passages $f$ are made of relatively large size, so that the liquor passes down from one tray to another in large quantities. The liquor thus passing into a tray is met by the jets of steam forced up through the baffle $b$ and is thrown up in a state of violent agitation or ebullition to the top or roof of the tray, the great bulk of the liquor passing entirely over the baffle, the spaces between the ends of the latter and the sides of the tray being restricted to oppose the passage of the liquor around the hood, thus causing it to flow or be thrown over the hood. During this action the liquor is more or less divided by the steam, and the entire mass passing through the tray is thus brought into intimate and thorough contact with the steam.

In order that the apparatus may be readily accessible for cleaning or other purposes, I provide a mud-hole covered by a plate $e$ in the wall of the tray A opposite each end of the elongated hoods $b$, above described, the mud-holes being of greater area than the cross-section of the hoods, so that the hoods may pass lengthwise through them. Through the mud-holes when the plates $e$ are removed the said hoods $b$ can be removed when desired. The hoods are made with removable ends $b'$, adapted to be bolted on or removed after the hood has been slid over or before it is removed from the upwardly-projecting steam-pipe $a$. The several removable plates may be fastened by thumb-screws, as indicated in Figs. 1, 2, and 3, or by square-headed bolts, as shown in the other figures, or in any other suitable way. Further, with the same object of rendering the apparatus easy of access for cleaning or other purposes I form the inlet and outlet pipes for the liquor from tray to tray as vertical channels or passages $f$ of half-round or other convenient section arranged directly against the side walls of the trays A, so that the side walls—for instance, the portions $g$—form part of the walls of the said inlet and outlet passages $f$. Mud-holes $h$ are also provided opening directly into the said pipes or channels, so that by removing the mud-hole covers $h'$ the said connecting passages or channels $f$ can be readily cleansed. The upper part $f'$ of the said passages or channels, which is attached to the floor of the chambers or trays, may be formed in one therewith, as shown, or fastened thereto. This is also the case with the lower portion $f^2$, or it may be made as in the drawings, where the upper part $f'$ is made in one with one tray and the lower part $f^2$ cast upon the side of the tray beneath in this case. Suitable flanges $f^3$ will be provided for making the necessary joint between each two successive trays.

In Fig. 2, A' is the lower chamber of the tower, fitted with the usual steam-inlet and liquid-outlet pipes $j$ $k$ and formed with a part $f^2$ of a channel $f$, so as to make the required connection with the tray next above it.

Figs. 4 and 5 show a modification wherein three elongated baffles $a$, $a'$, and $a^2$ are employed for the purpose of increasing the efficiency of the apparatus by causing the liquor in passing across the trays from the inlet to the outlet to pass three such steam-baffles. As in the case of the construction described in reference to Figs. 1 to 3, mud-holes are provided for use in removing the hoods for cleaning, either one large mud-hole being used, as shown, or one for each hood, according to the space at command and the distance at which the hoods are set apart.

It may be found advantageous in some cases to make the elongated openings $a$ and hoods $b$ curved, as shown in Fig. 6, appropriate mud-holes for their removal being provided.

Apparatus constructed as above described will operate with increased efficiency as compared with that of the old form of circular baffles, due to the fact that practically none of the liquor under treatment in passing through the trays can flow from the inlet to the outlet without passing under the influence of the steam issuing from the baffles. Further, the number of the baffles may be increased with a corresponding increase in the area over which the steam comes into contact with the liquor.

A further increase in efficiency is due to the improvement in the operation before described, the large quantity of liquor flowing through the apparatus being met by the steam in the manner set forth, thus causing a division of the liquor and its thorough commingling with the steam. Further, when it is desired to clean the working parts all that is necessary is to remove the covers of the mud-holes and slide out the hoods through the same. The liquor-channels also can be readily cleaned through the mud-holes opening thereinto, and the hood after cleaning can be slid back into place. The steam-channel can also be readily cleaned from the mud-holes, which allow of the removal of the hood.

I claim as my invention the following-defined novel features, substantially as hereinbefore specified, namely:

1. In apparatus for the distillation of ammoniacal liquors, the combination with each tray or chamber of inlet and outlet orifices disposed at opposite sides of said trays or chambers, and an elongated steam-opening $a$ and baffle-hood $b$ therefor between said inlet and outlet orifices, said orifices being of relatively large size, so that a large quantity of liquor is passed through the trays, and said baffle-hood being extended substantially across the full width of the tray so that it opposes the passage of the liquor from one side of the tray to the other, whereby substantially all the liquor is caused to pass over the hood, and is thereby subjected directly to the action of the steam, substantially as set forth.

2. In apparatus for the distillation of ammoniacal liquors, the combination with each tray or chamber of inlet and outlet orifices disposed at opposite sides of said trays or chambers, and an elongated steam-opening $a$ and a baffle-hood $b$ therefor, said opening and hood extending across substantially the full width of said chamber, whereby substantially all of the liquor is forced to pass over said hood from the inlet to the outlet orifices, and said steam-opening and hood adapted to deliver the steam at substantially right angles thereto, whereby to throw the liquor into a state of violent agitation.

3. In apparatus for the distillation of ammoniacal liquors, the combination with the floor of each tray or chamber of a narrow elongated steam-opening $a$, an elongated baffle-hood $b$ for said steam-opening, a mud-hole and cover in the wall of the chamber opposite the ends of said elongated baffle-hood, said mud-hole being of dimensions which will allow of the hood being removed therethrough and replaced, inlet and outlet pipes disposed on opposite sides of said steam-opening and baffle-hood, said steam-opening and hood extending across substantially the entire width of said chamber, whereby the passage of the liquor from the inlet to the outlet around said hood is opposed and it is substantially all forced to pass through or over the same and is thus subjected directly to the action of the steam, said inlet and outlet pipes being formed as vertical channels of half-round section disposed directly against the side walls of the tray, said side walls of the trays forming part of the walls of the pipes, mud-holes in the side walls of the trays opening directly into said inlet and outlet pipes, substantially as and for the purpose set forth.

4. In apparatus for the distillation of ammoniacal liquors, the combination with the floor of each tray or chamber of a narrow elongated steam-opening $a$, an elongated baffle-hood $b$ for said steam-opening, a mud-hole and cover in the wall of the chamber opposite the ends of said elongated baffle-hood, said mud-hole being of dimensions which will allow of the hood being removed therethrough and replaced, inlet and outlet pipes disposed on opposite sides of said steam-opening and baffle-hood, said steam-opening and hood extending across substantially the entire width of said chamber, whereby the passage of the liquor from the inlet to the outlet around said hood is opposed and it is substantially all forced to pass through or over the same and is thus subjected directly to the action of the steam, said inlet and outlet pipes having part of their section formed by vertical flanges projecting from the floor of the trays and the other portion of their section formed by the side walls of the trays, mud-holes in the side walls of the trays opening directly into said inlet and outlet pipes, substantially as and for the purpose set forth.

5. In apparatus for the distillation of ammoniacal liquors, the combination with the floor of each tray of a narrow elongated steam-opening $a$ passing across the width of said floor, and an elongated baffle-hood $b$ for said steam-opening, a mud-hole and cover in the wall of the tray opposite the ends of said elongated baffle-hood, said mud-hole being of greater area than the cross-section of said hood and said hood being of a shape to permit it to be passed lengthwise through said mud-hole to be removed and replaced, substantially as and for the purpose set forth.

6. In apparatus for the distillation of ammoniacal liquors, the combination with the floor of each tray of a narrow elongated steam-opening $a$, having an upward flange along each edge and passing across the width of said floor, and an elongated baffle-hood $b$ for said steam-opening with its edges extending downward over said flanges, detachable ends to said hood also extending downward over said flanges, a mud-hole and cover in the wall of the tray opposite the ends of said elongated baffle-hood, said mud-hole being of greater area than the cross-section of said hood, and said hood being of a shape to permit it to be passed lengthwise through said mud-hole to be removed and replaced, whereby access may be had to detach said ends and whereby after said ends are detached said hood may be slid over said flanges for removal, substantially as and for the purpose set forth.

7. In apparatus for the distillation of ammoniacal liquors, the combination with the floor of each tray of a number of parallel elongated steam-openings $a$ passing across the width of the floor, a number of elongated baffle-hoods $b$ one for each steam-opening, a mud-hole in the wall of the tray opposite the ends of the said elongated baffle-hoods, said mud-hole being of greater area than the cross-section of each of said hoods and said hoods being of a shape and in such positions as to permit of their being passed lengthwise through said mud-hole to be removed or replaced, substantially as and for the purpose set forth.

8. In apparatus for the distillation of ammoniacal liquors and formed of superposed trays, a tray, elongated steam-orifices $a$ in the floor of the tray and having an upward flange along each edge, an elongated baffle-hood $b$ covering said steam-orifice, a mud-hole with covers in the side walls of said tray opposite the ends of said baffle-hoods, said mud-holes being of greater area than the cross-section of each of said hoods and said hoods being of a shape to permit them to be passed lengthwise through said mud-holes to be removed and replaced, a flange formed integrally with the floor of the tray and projecting upward therefrom and inclosing a space against the side wall so that the side wall forms a part of the wall inclosing said space, said space forming together with a downwardly-projecting flange of corresponding shape on the tray beneath an outlet-pipe for the liquor from said tray, a flange at the opposite side of the baffle-hood formed integrally with and inclosing a space against the side wall of the tray open at its base to the floor of the tray at a level below that of the outlet-pipe said space forming together with the upward-projecting flange of the floor of the tray above, an inlet-pipe therefrom, a mud-hole in the side wall opening into said inlet-pipe, substantially as and for the purpose set forth.

9. A tray for ammonia-distilling apparatus comprising in a single casting a floor having a steam-opening and a liquor-outlet, a surrounding wall extending upward from said floor and formed at its edges for connection with the trays above and below it, an upward flange along the edges of said openings, and a liquor-inlet extending from a level below the upper edge of the outlet-flange to the level of the top of said wall.

10. A tray for ammonia-distilling apparatus comprising in a single casting a floor having an elongated steam-opening extending across it and a liquor-outlet at one side of said steam-opening and against the wall, a wall surrounding and extending upward from the floor and formed at its edges for connection with the trays above and below it, an upward flange along the edges of said openings, and a liquor-inlet at the opposite side of said steam-opening from the outlet and also against the wall extending from a level below the upper edge of the outlet-flange to the level of the top of the wall, said wall being formed with mud-holes opposite to and in line with the steam-opening and other mud-holes leading into said inlet and outlet.

In witness whereof I have hereunto signed my name in the presence of two subscribing witnesses.

GEORGE WILTON.

Witnesses:
REGINALD MARSH,
ROBERT W. SPEARPOINT.